United States Patent
Savois et al.

(10) Patent No.: US 11,122,799 B2
(45) Date of Patent: Sep. 21, 2021

(54) DISPERSANT COMPOSITION

(71) Applicant: OLEON NV, Evergem (BE)

(72) Inventors: Blandine Savois, Venette (FR); Karima Zitouni, Morangis (FR); Pierre Ravier, Compiegne (FR)

(73) Assignee: OLEON NV, Evergem (BE)

( * ) Notice: Subject to any disclaimer, the term of this patent is extended or adjusted under 35 U.S.C. 154(b) by 275 days.

(21) Appl. No.: 16/065,522

(22) PCT Filed: Dec. 22, 2016

(86) PCT No.: PCT/IB2016/057945
§ 371 (c)(1),
(2) Date: Jun. 22, 2018

(87) PCT Pub. No.: WO2017/109751
PCT Pub. Date: Jun. 29, 2017

(65) Prior Publication Data
US 2019/0133121 A1 May 9, 2019

(30) Foreign Application Priority Data

Dec. 23, 2015 (FR) .................................. 1563196
Jul. 19, 2016 (FR) .................................. 1656871

(51) Int. Cl.
| | | |
|---|---|---|
| *A01N 25/30* | (2006.01) | |
| *A01N 43/40* | (2006.01) | |
| *B01F 17/00* | (2006.01) | |
| *A01N 25/04* | (2006.01) | |
| *C11D 7/26* | (2006.01) | |
| *C11D 7/50* | (2006.01) | |
| *A01N 25/02* | (2006.01) | |
| *A01N 43/653* | (2006.01) | |

(52) U.S. Cl.
CPC ............ *A01N 25/30* (2013.01); *A01N 25/02* (2013.01); *A01N 25/04* (2013.01); *A01N 43/40* (2013.01); *A01N 43/653* (2013.01); *B01F 17/0085* (2013.01); *B01F 17/0092* (2013.01); *C11D 7/266* (2013.01); *C11D 7/5009* (2013.01); *B01F 17/0021* (2013.01); *B01F 17/0057* (2013.01)

(58) Field of Classification Search
CPC ................................ A01N 25/30; A01N 43/40
See application file for complete search history.

(56) References Cited

U.S. PATENT DOCUMENTS

| | | | | |
|---|---|---|---|---|
| 5,962,390 A | * | 10/1999 | Flynn ................ | C07C 43/12 510/286 |
| 6,376,452 B1 | * | 4/2002 | Flynn ................ | C07C 43/12 510/285 |
| 6,673,157 B1 | * | 1/2004 | McKim ............... | C09D 9/005 134/2 |
| 9,574,109 B2 | * | 2/2017 | Ahn ................... | C09D 143/04 |
| 2002/0192256 A1 | * | 12/2002 | Wu .................... | A01N 43/90 424/405 |
| 2003/0104960 A1 | * | 6/2003 | Opre .................. | C11D 7/5009 510/201 |
| 2005/0064004 A1 | * | 3/2005 | Schnabel ........... | A01N 25/02 424/405 |
| 2006/0138399 A1 | * | 6/2006 | Itano ................. | C11D 7/265 257/40 |
| 2011/0212867 A1 | * | 9/2011 | Lallier ............... | C09D 9/005 510/213 |
| 2011/0312497 A1 | * | 12/2011 | Barg ................. | A01N 25/00 504/358 |
| 2019/0133121 A1 | * | 5/2019 | Savois ............... | A01N 43/40 |

FOREIGN PATENT DOCUMENTS

| | | | | |
|---|---|---|---|---|
| CA | 2971795 A1 | * | 6/2016 | ............ A01N 25/30 |
| WO | WO 99/10438 A1 | | 3/1999 | |
| WO | WO 2012/123408 A1 | | 9/2012 | |
| WO | WO-2012123408 A1 | * | 9/2012 | ............ A01N 25/04 |

OTHER PUBLICATIONS

Fil-Ester 618/618K Coconut Methyl Ester, Technical Data Sheet, Internet Citation, Chemrez Technologies, Inc., 2009, http://www.guanshinyeh.com/tw/upload/F, 1 page.
International Search Report issued in International Patent Application No. PCT/1132016/057945, dated Mar. 15, 2017 (3 pages).

\* cited by examiner

*Primary Examiner* — Nicole M. Buie-Hatcher
*Assistant Examiner* — M. Reza Asdjodi
(74) *Attorney, Agent, or Firm* — Arent Fox LLP

(57) ABSTRACT

Disclosed is a composition comprising, substantially consisting of or consisting of: —at least 30% of DMSO; and —at least 20% of a fatty acid methyl ester or a mixture of said type of esters, the fatty acid containing 6 to 10 carbon atoms, the percentages being in percent by weight in relation to the total weight of the composition. The invention also relates to the use of a composition of said type as a cleaning agent and/or dispersion and to a method for synthesizing said composition.

17 Claims, No Drawings

DISPERSANT COMPOSITION

CROSS REFERENCE TO RELATED APPLICATIONS

This application is a 35 U.S.C. 371 National Phase of PCT Application No. PCT/IB2016/057945 filed Dec. 22, 2016, which claims benefit to FR Application Nos. 15/63196 filed Dec. 23, 2015 and 16/56,871 filed Jul. 19, 2016, the disclosures of which are hereby incorporated by reference in their entireties.

FIELD OF THE INVENTION

The present invention relates to a composition allowing the cleaning, dispersion, disaggregation, solubilization and/or dissolution, partial or total, of substances which are slightly hydrophilic or not at all hydrophilic, and in particular polyurethane.

PRIOR ART

Dimethyl sulfoxide (DMSO), is a compound of empirical formula $(CH_3)_2SO$, of molecular weight 78.13 g/mol and with CAS number: 67-68-5. This very polar compound is a solvent of various organic polymers and resins and can be used for cleaning residues of paints or of styrene copolymers. However, its high crystallization point (18° C.) makes it a difficult compound to handle and to store.

US published patent application US2003/104960 (OPRE et al) describes a complex mixture of DMSO, two esters (a diester of C3-C10 carboxylic acids and a lactic acid ester $(C_3H_6O_3)$), a carbonate and a tertiary amine. This composition is used for cleaning a residue of copolymers based on styrene and acrylonitrile.

US published patent application US 2011212867 (LALLIER et al) teaches the use of a moderately polar compound selected from the group of ethers, ketones and esters to be combined with DMSO in order to obtain synergetic effects. This document describes the combination of a diol and a triol in order to produce a cleaning composition comprising DMSO in a way that lowers the crystallization point thereof and allows the exterior use of the composition at temperatures lower than 18° C. The stripping power for layers of paints of such a composition is equivalent to pure DMSO. However, the presence of hydroxyl functional groups capable of reacting with other compounds is a drawback.

U.S. Pat. No. 6,673,157 describes compositions for cleaning, removing or stripping layers of paint which comprise in particular the mixture of an ester and DMSO. One of the compositions exemplified comprises ethyl lactate, a compound which has stripping properties for polyurethane-based paints. However, such a compound is ineffective for stripping and/or disaggregation of polyurethane foams.

The solid residues of polyurethane foam type are particularly difficult to remove and the solvent currently used is N-Methyl-2-pyrolidone (NMP), which is a toxic and dangerous solvent.

A polyurethane foam is distinguished from a polyurethane by the fact that a gas is incorporated into the final product due to the presence during polymerisation of an expansion agent such as $CO_2$. The product obtained contains a dispersion of gas cells in a polymer network. The apparent density of such polyurethane foams is generally less than 100 kg/m$^3$, for example from 5 to 80 kg/m3. It can however be greater than these densities and reach 400 kg/m$^3$. The apparent density of a polyurethane foam can be determined according to the standard ISO 845. It is not only the polymer formed which contributes to the properties of the foam, but also, the cell structure formed by the gas. In order to disaggregate a foam, the solvent must be able to penetrate the foam.

A purpose of the invention is to overcome the above-mentioned drawbacks by providing a composition with reduced toxicity, that is less polluting for the environment and having an improved biodegradability index, which comprises DMSO and which makes it possible to obtain results and/or properties at least equivalent to pure DMSO and/or to the compositions based on DMSO which are already known, without having the drawbacks thereof.

DESCRIPTION OF THE INVENTION

Unexpectedly, it has been found that by mixing DMSO and a fatty acid methyl ester in specific proportions, a composition is obtained with a dispersant, disaggregating, solubilizing and/or dissolving power that is at least equivalent, and in certain cases increased, with respect to pure DMSO.

According to an embodiment, the invention relates to a composition comprising, essentially consisting of or consisting of:
- at least 30% of dimethyl sulfoxide (DMSO), and
  - at least 20% of a fatty acid methyl ester or a mixture of such esters, said fatty acid comprising, or having, from 4 to 22 carbon atoms, preferably from 4 to 12 carbon atoms, advantageously from 6 to 10 carbon atoms and yet more preferentially from 8 to 10 carbon atoms;

these percentages being by mass, of the total mass of the composition.

The fatty acid methyl esters have no dissolving or disaggregating power per se as regards compounds based on polyurethane foams. However, even present in high proportion, or even in a majority proportion, the presence of methyl esters not only does not lower the effectiveness of DMSO, but can improve it.

A fatty acid methyl ester is a methyl alkanoate with an aliphatic chain, said chain being able to be branched or linear, saturated or unsaturated. The fatty acids are preferably of plant/animal origin. They can originate for example from palm, copra, palm kernel or sunflower oil.

The expression "essentially consisting of" relates in particular to the fact that if other components are present in the composition, they have no technical effects linked to the invention. Alternatively or additionally, this expression can also be interpreted as relating to a composition which does not comprise more than 10%, by mass, optionally not more than 5%, by mass with respect to the total mass of the composition, of compounds other than those mentioned in the composition. C8 and C10 fatty acid methyl esters (i.e. the fatty acids of which comprise 8 or 10 carbon atoms) have shown a particular synergy in combination with DMSO. Similarly C6 methyl esters have also shown particular properties when combined with DMSO. Alternatively C6, C12, C14, C16 fatty acid esters can also be used. Similarly for C7, C9, C11, C13 and C15 esters.

The fatty acid methyl esters can be used pure or in mixtures in the composition. Thus a mixture of esters comprising, or essentially consisting of, C8 and C10 methyl esters, optionally in combination with one or more C6 methyl esters, can lead to a composition having a high dissolving power. In this mixture, the proportion of C8 fatty acid methyl ester(s) can vary from 45 to 69%, preferably from 48 to 65%, by mass with respect to the total mass of the mixture of esters. The proportion of C10 fatty acid methyl esters can vary from 31 to 55%, preferably from 35 to 50%, by mass with respect to the total mass of the mixture of esters.

However, the relative concentration by mass of the C6 fatty acid methyl ester(s) with respect to the other methyl ester(s) is advantageously less than or equal to 10%, preferably less than or equal to 5, or 4.5,%, for example from 1 to 5, or 4.5,%. Such a mixture can be a product of natural origin and can therefore contain a low proportion of other esters, for example C6 (<1%) or C12 (<2%).

The ester of methyl ricinoleate (C18:1OH>87%, (C18:1, C18:2, C18:3; C18, C16<13%)), is a mixture of esters, generally originating from castor oil, which can be advantageously used in the composition according to the invention.

The fatty acid of the fatty acid methyl ester can also comprise, or have, from 4 to 10 carbon atoms, preferably from 8 to 10 carbon atoms.

The proportion of the methyl ester or the mixture of fatty acid methyl esters is preferably at least 25%, 27%, 35%, 40%, 45%, 50%, 55% or 60% by mass with respect to the total mass of the composition.

Alternatively, the proportion of the methyl ester, or of the mixture of fatty acid methyl ester is preferably at most 25%, 27%, 35%, 40%, 45%, 50%, 55%, 60% or 70% by mass with respect to the total mass of the composition.

The proportion of methyl ester(s) can thus range from 20% to 70%, from 30% to 60%, and/or from 40 to 50%.

The proportion of DMSO is preferably at most 75%, 70%, 65%, 60%, 55%, 50%, 45%, 40% or 35% by mass with respect to the total mass of the composition. Alternatively, the proportion of DMSO is preferably at least 35%, 40%, 45%, 50% or 55% by mass with respect to the total mass of the composition.

The proportion of DMSO comprised in the mixture can thus range from 30% to 75%, from 35% to 60%, from 40 to 50%, and/or from 36 to 44%.

The composition according to the invention can thus comprise at least 35% of DMSO and at least 25% of said methyl ester, or of a mixture of such esters.

According to a preferred embodiment, the composition according to the invention essentially only contains DMSO and at least one fatty acid methyl ester (FAME) or a mixture of such esters. The ratio of the masses of DMSO/FAME(s) can then advantageously be approximately 40/60.

The composition according to the invention can further comprise at least 5%, preferably at least 10%, by mass of another compound, said compound being selected from the group constituted by Triacetin (CAS No. 102-76-1) or 1,3-diacetyloxypropan-2-yl acetate (IUPAC), glycerol monolaurate diacetate, glycerol dilaurate acetate, ester dimethyl isosorbide (DMI) (CAS number: 93920-28-6/RADIA 7926 the company OLEON) and isosteramide (a mixture of laurylamide DEA (CAS No. 92680-75-6, the company Antaichem) and cocamide DEA (CAS No. 68603-42-9; the company CHEMOS) and the mixtures thereof.

Glycerol monolaurate diacetate is a chemical compound of linear chemical formula $C_{19}H_{34}O_6$ and its CAS number: 30899-62-8.

The quantity of this other compound can be more than 15%, more than 20% or more than 25% by mass of the total mass of the composition.

The quantity of this other compound can be less than 30%, less than 25%, less than 20%, or less than 15% by mass of the total mass of the composition.

The proportion of this other compound can thus range from 5% to 50%, from 10 to 40%, from 20 to 30% and/or from 15 to 25% by mass with respect to the total mass of the composition.

Preferably, the composition according to the invention contains a mixture of compounds, in particular a mixture of glycerol monolaurate diacetate and glycerol dilaurate acetate or a mixture of DEA such as isosteramide. Such a composition is particularly effective, stable, simple to use and has a reduced environmental impact and toxicity. Thus, the mass ratios of the DMSO/FAME(s)/C components of such a composition, can be approximately 40/30/30, 40/40/20 or 30/45/25.

Alternatively, the composition is constituted by more than 85% by mass of DMSO and of said fatty acid methyl ester, or mixtures thereof as described above, this percentage being by mass with respect to the total mass of the composition.

The composition according to the invention can be used pure or diluted.

Advantageously the composition according to the invention does not contain triols, diols and/or alcohol in general.

The composition according to the invention can also not contain ethyl lactate, alkyl lactates (lactate esters) and/or diesters.

The composition according to the invention can advantageously not contain apolar solvents such as, for example, aliphatic hydrocarbons and/or aromatic hydrocarbons, these being able to be halogenated, or not halogenated.

The invention also relates to the use of a composition as described previously as a cleaning, dispersant, disaggregating, solubilizing or dissolving agent for organic compounds, for example polymers. This use comprises a step of placing the composition according to the invention and the organic compound(s) to be treated in contact.

In particular the composition can be used as a cleaning agent for polyurethane foams or as a dispersion agent for pesticides. More particularly, the composition can be used as a solubilizing agent for an active compound, such as a pesticide (for example Clodinafop-propargyl or Difenoconazole).

The active compound is generally an organic compound, preferably C12-C25. It advantageously comprises at least 2 aromatic rings, which can be linked to one another, directly or not, via an oxygen atom. Thus, the active compound can comprise an ether function, preferably 2 and even more preferentially 3 ether functions (—O—). The aromatic rings can be identical or different, in particular they can be aromatic rings comprising carbon atoms only, and/or be hetero-aromatic rings, i.e. comprising at least one heteroatom such as nitrogen or oxygen. Preferably, at least one of these rings is a ring with 6 atoms. The active compound can thus be an organic compound having 15 to 21 carbon atoms, 2 aromatic rings with 6 atoms, said rings being linked directly to one another by an oxygen atom, and comprising 3 ether functions.

The active compound can in particular be an aryloxyphenoxypropionate and/or a heteroaryloxyphenoxypropionate.

A composition comprising a composition according to the invention as described above as well as an active compound, preferably in solution, is also a subject of the invention.

A process for the synthesis of a composition according to the invention such as described above is also a subject of the invention. Such a process comprises a step of mixing DMSO with said fatty acid methyl ester(s).

EXAMPLES OF COMPOSITIONS ACCORDING TO THE INVENTION AND COMPARATIVE TESTS

Example 1

The compounds used to produce the compositions described in these examples are the following:
- DMSO of standard/technical quality (supplier the company ARKEMA).
- A mixture of fatty acid methyl esters (FAMEs), these fatty acids being in the majority (for example at more than 90% by mass) C8 and C10 fatty acids (CAS No. 85566-26-3 and EC No.: 287-636-4). The mixture used is that marketed under the trade mark Radia 7983 by the company OLEON, which contains 4.5%, or less, of C6 fatty acid methyl ester. The C8 content in the mixture varies from 48 to 65%, by mass and the C10 content varies from 35 to 50% by mass.
- A mixture of glycerol monolaurate diacetate and of glycerol dilaurate acetate of trade mark Radia 7909 (supplier the company OLEON).
- DMI (ether dimethyl isosorbide) (CAS No. 5306-85-4 and EC No. 226-159-8)
- R7926 isosteramide
- Mixture of laurylamide DEA and cocamide DEA (CAS No.: 68603-42-9 and EC No.: 271-657-0)

In order to produce the cleaning compositions (or formulae) according to the invention, the different compounds were weighed, then mixed manually with one another in a glass beaker using a metal spatula. The mixing was carried out at ambient temperature (21° C.). No order of introduction was followed in particular. Once all the ingredients of the composition had been introduced, stirring was maintained for approximately 10 mn.

The comparative compositions making it possible to demonstrate the properties of the compositions according to the invention were obtained according to the same process.

The compositions of the invention A to H were synthesized according to the process described above. The formulations of these compositions are described in Table I.

TABLE I

| Composition | DMSO* | Radia 7983 | Radia 7909 | DMI | R7926 |
|---|---|---|---|---|---|
| A | 40% | 60% | / | / | / |
| B | 40% | 30% | 30% | / | / |
| C | 40% | 40% | 20% | / | / |
| D | 40% | 50% | / | 10% | / |
| E | 40% | 25% | 25% | 10% | / |
| F | 40% | 35% | 15% | 10% | / |
| G | 40% | 40% | / | / | 20% |
| H | 30% | 45% | 25% | / | / |

*by mass with respect to the total mass of the composition

Example 2: Measurements of Firmness (Maximum Force)

In order to assess the softening of a polyurethane foam after contact with the compositions according to the invention, and therefore their disaggregating/dissolving power, the firmness of a foam treated with the compositions according to the invention was tested. In addition the same foams were treated by the compounds (ingredients) of the composition, either alone, or in pairs, or with an amorphous solvent (water) in order to establish the synergic action of the compositions according to the invention.

By firmness is meant the force required to reach a predefined surface deformation of the product tested. This force is expressed in newtons (N).

The firmness measurements were carried out with the TA1 Texture Analyzer from the company Lloyd Instruments. The test was carried out in the following way for all the compositions and ingredients tested:

Squares of rigid polyurethane foam with a surface area of 2.5 cm×2.5 cm and a thickness of 12 mm were placed in 25 ml containers with 20 g of compositions according to the invention for 1 hour and 2 hours. The TA1 Texture Analyzer was provided with a cylindrical probe (diameter 12 mm, height 50 mm).

A pre-stress of 0.2 N was applied at a rate of 100 mm/s. The rate of descent of the probe is 20 mm/sec and the depth of penetration of the probe is 8 mm. The results are presented in the following table:

The firmness of the rigid polyurethane foam, tested under the same conditions as described above, is 43N.

|  | Contact time of the formulation with the foam: | |
|---|---|---|
|  | 1 hour Force in Newtons (N) | 2 hours Force in Newtons (N) |
| A | 0.56104 | 0.54161 |
| B | 0.52259 | 0.48863 |
| pure DMSO | 0.74766 | 0.5567 |
| DMSO/water (40/60)* | 36.003 | 35.21 |
| Radia 7983 | 19.71 | 18.77 |
| Radia 7909 | 36.842 | 35.070 |
| DMSO/7909 (40/60)* | 23.886 | 1.840 |
| Radia 7983/Radia 7909 (30/70)* | 31.070 | 27.809 |

*as a percentage by mass of the total composition

The weaker the force exerted by the probe the less rigid the foam will be and the more the formulation will have degraded the foam.

It is thus demonstrated that, surprisingly, the compositions according to the invention which comprise a reduced proportion of DMSO have a capacity for the disaggregation of polyurethane foams, at least equal to, or even greater than, pure or diluted DMSO and that this disaggregation is carried out more rapidly.

Example 3: Measurements of Disaggregation: Visual Evaluation

The results by Texture Analyzer are consistent with the visual measurements of disaggregation presented hereafter, which were carried out beforehand on the same rigid polyurethane foams as those used in the previous test.

Protocol: samples of polyurethane foams of comparable volume and shape are each placed in a beaker and contacted with the composition.

After time intervals, the samples were removed using forceps and their textures were assessed by pressure with a spatula and visually, then replaced in the beaker. A score was attributed by the tester on a scale of 0 to 3 (Table II) and the results are compiled in Table II.

TABLE II

| Composition | Score at 40 minutes | Score at 1 h | Score at 2 h | Score at 3 h |
|---|---|---|---|---|
| A | 2 | 3 | 3 | 3 |
| B | n/m | 3 | 3 | 3 |
| C | 2 | 3 | 3 | 3 |

TABLE II-continued

| Composition | Score at 40 minutes | Score at 1 h | Score at 2 h | Score at 3 h |
|---|---|---|---|---|
| D | n/m | 2 | 2 | 2 |
| E | n/m | 3 | 3 | 3 |
| F | n/m | 3 | 3 | 3 |
| G | n/m | 2 | 2 | 3 |
| pure DMSO | 2 | 2 | 2 | 3 |
| DMSO/7983 (20/80)* | 1 | 1 | 2 | 2 |
| Radia 7909 | 0 | 0 | 0 | n/m |
| Radia 7983 | 0 | 0 | 0 | n/m |
| Radia 7909/7983 (30/70)* | 0 | 0 | 0 | n/m |
| DMSO/7909 (40/60) | 0 | 0 | 0 | n/m | n/m = not measured
*in percentage by mass with respect to the total mass of the composition Scale of grading the visual evaluation of the disaggregating power of the composition

```
0 = no action
1 = weak action
2 = good action
3 = very good action
```

These observations make it possible to establish the specific effectiveness of the compositions according to the invention.

Example 4: Composition According to the Invention and its Use for the Solubilization of a Phytosanitary Active Ingredient Such as Clodinafop Propargyl Products used
DMSO (Technical grade Arkema)
Methyl ester mixture (Radia 7983-OLEON)
Triacetin (CAS No. 102-76-1) or 1,3-diacetyloxypropan-2-yl acetate (IUPAC) marketed by the company Alfa Aesar.

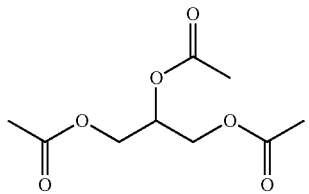

methyl-5-(dimethylamino)-2-methyl-5-oxopentoate; CAS No. 1174627-68-9 an ester amide marketed under the trade mark Rhodiasolv Polarclean by the company Rhodia.
Clodinafop-propargyl (CAS No. 105512-06-9) a herbicide of formula:

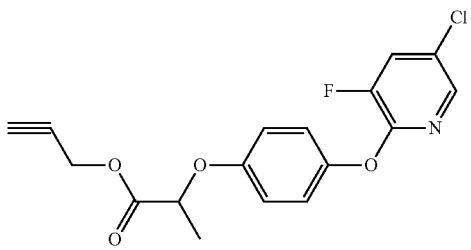 [SMILES: C#CCOC(=O)C(C)Oc1ccc(Oc2ncc(Cl)cc2F)cc1]

Equipment:
15 ml flasks
Precision balance to 0.001 g
Procedure:
A composition H according to the invention is prepared in a 100 mL flask, 40 g of DMSO are weighed then 40 g of Radia 7983 and 20 g of Triacetin are added. The flask is stirred for a few seconds until homogenization.

2.4 g of Clodinafop-propargyl are weighed in a 15 mL flask, the mass is made up to 10 g by adding composition H.

For the purposes of comparison a solubilizing agent based on ester amide, Rhodiasolv Polarclean, is used as control example 2.4 g of Clodinafop-propargyl are weighed in a 15 mL flask, to which Rhodiasolv Polarclean is added in order to obtain a final mass of 10 g.

The two flasks are stirred manually for 3 to 4 minutes in order to obtain homogeneous and clear mixtures.

Results:

| Formulations | Appearance after 7 days at ambient temperature |
|---|---|
| Composition H + 24% by mass of Clodinafop propargyl | Clear and homogeneous |
| Rhodiasolv Polarclean + 24% by mass of Clodinafop propargyl (control example) | Clear and homogeneous |

Composition H according to the invention perfectly solubilizes the herbicide, and the formulation thus obtained remains stable, clear and homogeneous, at ambient temperature.

Example 5: Compositions According to the Invention and their Use for the Solubilization of a Phytosanitary Active Ingredient Such as Difenoconazole (Pesticide)

Products used
DMSO (Technical grade Arkema)
Mixture of methyl esters (Radia 7983-OLEON)
Triacetin (CAS No. 102-76-1) or 1,3-diacetyloxypropan-2-yl acetate (IUPAC) marketed by the company Alfa Aesar.

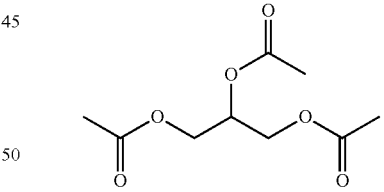

methyl hexanoate (Sigma Aldrich)
Difenoconazole (CAS No. 119446-68-3) from Yifan Biotechnology group Co. Ltd., pure to at least 95% and of formula:

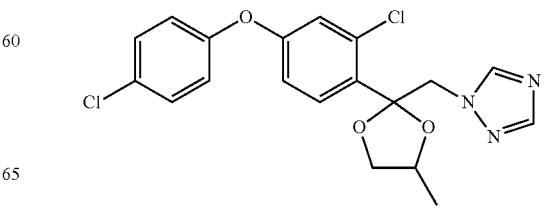

Compositions according to the invention are produced by mixing Difenoconazole with the solubilizing compositions according to the invention. Composition H described above is used as well as a composition based on methyl hexanoate, DMSO and R7909. These formulations are produced according to the same protocol as in Example 4 above describing the solubilization of Clodinafop-Propargyl. The percentages mentioned are percentages by mass with respect to the total mass of the composition.

| Formulations | Solubilization of Difenoconazole at $T_{amb}$ Appearance after 7 days | Solubilization of Difenoconazole at 0° C. Appearance after 7 days |
| --- | --- | --- |
| 40% DMSO (Arkema) + 40% C8/C10 Me (R7983) + 20% Triacetin | clear liquid | clear liquid |
| 40% DMSO (Arkema) + 40% methyl hexanoate (Sigma Aldrich) + 20% R7909 | clear liquid | clear liquid |

The compositions according to the invention perfectly solubilize the pesticide, and the formulations thus obtained remain stable, clear and homogeneous, at ambient temperature and at 0° C.

Example 6: Comparative Stability Tests

While the Compositions According to the Invention a to H are Stable, it is not the Same for mixtures of DMSO and C12 and C12/C14 methyl esters. Thus the compositions according to the invention, when the methyl ester is C6-C10, make it possible to obtain at the same time stable and effective compositions for solubilizing active ingredients and for cleaning and/or removing polyurethane foams or their residues.

The mixtures were produced according to the same procedures as those described above. Methyl laurate (Radia 7118 from the company OLEON) is the C12 methyl ester (C12 Me) and methyl laurate-myristate (sold under the trade name Edenor ME C12-14 MY by the company Emery) is a mixture of C12 and C14 methyl esters (C12C14 Me). The percentages mentioned are percentages by mass with respect to the total mass of the composition. The results are the following:

| Compositions | Appearance |
| --- | --- |
| 40% DMSO + 40% C12 Me + 20% Triacetin | 2 phases |
| 40% DMSO + 40% C12C14 Me + 20% Triacetin | 2 phases |
| 40% DMSO + 40% C12 Me + 20% R7909 | 2 phases |
| 40% DMSO + 40% C12C14 Me + 20% R7909 | 2 phases |

These results show that the use of methyl esters (C12 and C14) other than C6-C10, does not make it possible to obtain a composition comprising only a single phase. The addition of Triacetin or R7909 does not help the solubilization of the compounds.

Comparative Example 7: Stripping Power of Ethyl Lactate on a Paint Based on Polyurethane and Disaggregating Power of this Same Compound on a Polyurethane Foam Equipment:
1 steel plate of dimensions 20×10 cm
Ethanol
Polyurethane paint of satin black colour
Ethyl lactate, or ethyl 2-hydroxypropanoate, (sold by the company Sigma Aldrich)
Paint roller
Cotton bud
3 ml plastic pipette
Protocol:
Preparation of the Paint Plate:
A layer of paint is applied using a roller onto a steel plate previously degreased with ethanol and dried using compressed air. The paint is left to dry in ambient air for 72 hours.
Application of Ethyl Lactate onto the Painted Plate:
3 drops of ethyl lactate are deposited using a pipette onto the plate coated with dried paint.
The plate is inclined at an angle of 20° to allow the ethyl lactate to cover the 10 cm height of the plate.
Visual evaluation of the action of the ethyl lactate on stripping the film of paint after contact with the ethyl lactate:
After contact for 5 minutes, a cotton bud is passed over the surface corresponding to the path (the run) of ethyl lactate, entraining the paint films.
Conclusion: Ethyl lactate strips a polyurethane paint.
The ethyl lactate was applied to a PU foam according to the protocol of Example 3 in order to study its disaggregation properties. The results obtained were:

| Composition | Score at 40 minutes | Score at 1 h | Score at 2 h | Score at 3 h |
| --- | --- | --- | --- | --- |
| Ethyl lactate | 0 | 0 | 0 | 0 |

Thus, if certain alkyl esters have a dissolving effect on paints based on polyurethane, the presence of such an effect is not an indication of the existence of a disaggregating effect on polyurethane foams.

The invention is not limited to the embodiments presented and other embodiments would be clearly apparent to a person skilled in the art.

The invention claimed is:

1. A composition comprising:
30% to 40% of dimethyl sulfoxide, or DMSO, and
20% to 60% of a mixture of fatty acid methyl esters, said fatty acid having 8 to 10 carbon atoms,
these percentages being by mass with respect to the total mass of the composition,
wherein the mixture of fatty acid methyl esters comprises:
from 45 to 69%, of $C_8$ fatty acid methyl ester(s); and
from 31 to 55%, of $C_{10}$ fatty acid methyl ester(s),
these percentages being by mass with respect to the total mass of the mixture of esters.

2. The composition according to claim 1, said composition comprising 35% to 40% of DMSO and 25% to 60% of said methyl ester or of said mixture of such esters, these percentages being by mass with respect to the total mass of the composition.

3. The composition according to claim 1, said composition comprising from 36% to 40% of DMSO, these percentages being by mass with respect to the total mass of the composition.

4. The composition according to claim 1, said composition comprising 27% to 60% of said methyl ester or of said mixtures of methyl esters, this percentage being by mass with respect to the total mass of the composition.

5. The composition according to claim 1, said composition further comprising at least 5%, by mass with respect to the total mass of the composition, of another compound, said compound being selected from the group consisting of triacetin, glycerol monolaurate diacetate, glycerol dilaurate acetate, isosteramide and mixtures thereof.

6. The composition according to claim 1, wherein more than 85% of said composition is the mixture of said DMSO and of said methyl ester or of said mixture of methyl esters, this percentage being by mass with respect to the total mass of the composition.

7. The composition according to claim 1, said composition comprising an aryloxyphenoxypropionate.

8. The composition according to claim 7, wherein the aryloxyphenoxypropionate is Difenoconazole or Clodinafop-Propargyl.

9. A method for cleaning or removing polyurethane foam comprising applying a composition according to claim 1 to a polyurethane foam.

10. A method for solubilizing or dispersing an active ingredient comprising mixing a composition according to claim 1 with the active ingredient.

11. The method of claim 10, wherein the active ingredient is Difenoconazole or Clodinafop-Propargyl.

12. The method of claim 10, wherein the active ingredient is a pesticide.

13. A process for the synthesis of a composition according claim 1, said process comprising a step of mixing DMSO with said fatty acid methyl ester(s).

14. The composition according to claim 1, said composition further comprising at least 10%, by mass with respect to the total mass of the composition, of another compound, said compound being selected from the group consisting of triacetin, glycerol monolaurate diacetate, glycerol dilaurate acetate, isosteramide and mixes thereof.

15. The composition according to claim 1, said mixture of methyl esters IS:
from 48 to 65%, of $C_8$ fatty acid methyl ester(s); and
from 35 to 50%, of $C_{10}$ fatty acid methyl ester(s);
these percentages being by mass with respect to the total mass of the mixture of esters.

16. The composition of claim 15, further comprising from 0 to 4.5% of $C_6$ fatty acid methyl ester(s), the percentage being by mass with respect to the total mass of the mixture of esters.

17. The composition of claim 1, further comprising from 0 to 4.5% of $C_6$ fatty acid methyl ester(s), the percentage being by mass with respect to the total mass of the mixture of esters.

* * * * *